United States Patent [19]
Lähdemäki et al.

[11] Patent Number: 5,381,474
[45] Date of Patent: Jan. 10, 1995

[54] METHOD OF CONVERGING AN ECHO CANCELLER

[75] Inventors: Heimo Lähdemäki, Pirkkala; Jaakko Sippola, Tampere, both of Finland

[73] Assignee: Nokia Telecommunications Oy, Espoo, Finland

[21] Appl. No.: 81,323

[22] Filed: Jun. 23, 1993

[30] Foreign Application Priority Data

Nov. 4, 1991 [FI] Finland .................. 915196

[51] Int. Cl.6 .................................. H04M 9/08
[52] U.S. Cl. ............................ 379/410; 379/406; 379/407; 379/411; 379/402; 370/32; 370/32.1; 370/24
[58] Field of Search ........... 379/410, 406, 402, 411, 379/407, 3, 6; 370/32, 32.1, 24

[56] References Cited

U.S. PATENT DOCUMENTS

| | | | |
|---|---|---|---|
| 3,465,106 | 9/1969 | Nagata et al. | |
| 3,735,055 | 5/1973 | Thomas | 379/410 |
| 4,425,483 | 3/1981 | Lee et al. | 379/411 |
| 4,593,161 | 6/1986 | Desblache et al. | 379/411 |
| 4,727,566 | 2/1988 | Dahlqvist | 379/3 |
| 4,827,472 | 5/1989 | Ferrieu | 379/410 |
| 4,887,257 | 12/1989 | Belloc et al. | 379/410 |
| 5,008,923 | 4/1991 | Kitamura et al. | 379/3 |

FOREIGN PATENT DOCUMENTS 508847 10/1992 European Pat. Off.

Primary Examiner—James L. Dwyer
Assistant Examiner—J. M. Saint-Surin
Attorney, Agent, or Firm—Cushman, Darby & Cushman

[57] ABSTRACT

Converging of an echo canceller (4A–D) integrated into a telephone exchange (1, 2) is initiated at the start of a telephone call by an internal command of the telephone exchange given by a call control (2) of the telephone exchange as soon as the call control (2) has observed an off-hook state of a called subscriber connection. The command causes the echo canceller (4A–D) to transmit a test signal to the echo path for converging the echo canceller before appearance of the speech signal.

8 Claims, 1 Drawing Sheet

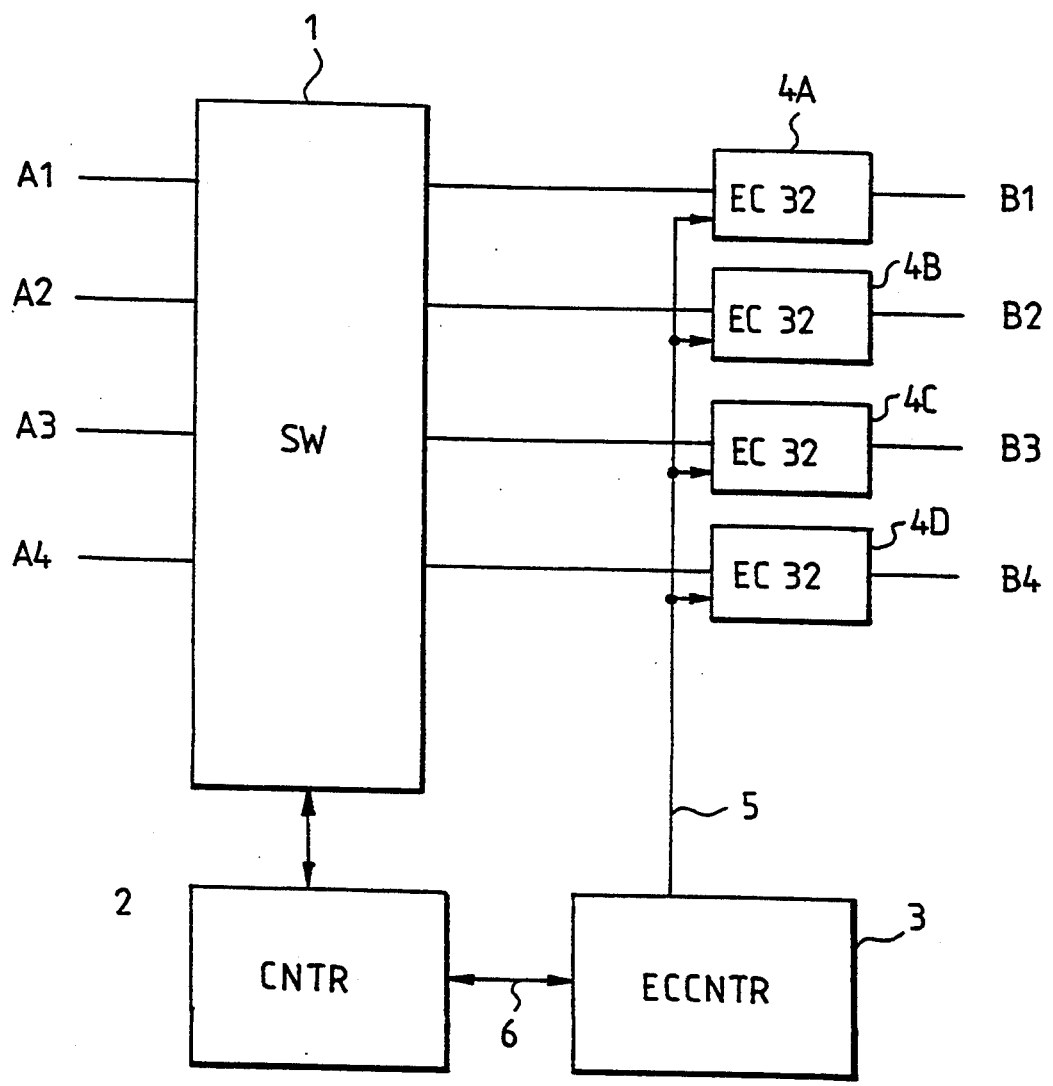

METHOD OF CONVERGING AN ECHO CANCELLER

FIELD OF THE INVENTION

The invention relates to a method of converging an echo canceller at the start of a telephone call.

BACKGROUND OF THE INVENTION

End-to-end connections of a data transmission system, such as a telephone network, often show long transit time delays, in consequence of which echo is observed, for instance, in the case of normal speech, when a signal is reflected from the far end of a connection back to the talker.

An echo canceller is a device for processing a signal, such as a speech signal, so as to reduce echo by subtracting estimated echo from the echo (signal) occurring in a connection. The echo canceller can be either digital or analog. Echo cancelling devices are at present realized by digital signal processing, by means of which it is possible to model echo paths including considerably long transit time delays. A digital adaptive filter is then used, in which the coefficients of the filter modelling the echo path are updated on the basis of a correlation of the speech signal and the returning echo signal.

Since the echo path in principle is different of each call, it is necessary to apply to the echo canceller a method which always adapts itself to a new echo path at the start of a call. It takes a little time to converge the echo canceller, i.e. to create a model of the echo path after the speech has begun in the connection, and therefore, echo occurs momentarily at the start of the call before the echo canceller has been converged.

SUMMARY OF THE INVENTION

The object of the invention is a method which makes it possible to converge an echo canceller as soon as possible at the start of a telephone call.

This is achieved according to the invention by means of a method of converging the echo canceller at the start of a telephone call, which method is characterized by initiating a converging of the echo canceller integrated into a telephone exchange by an internal command of the telephone exchange given by a call control of the telephone exchange as soon as the call control has observed an off-hook state of a called subscriber connection, the command causing the echo canceller to transmit a test signal to the echo path for converging the echo canceller before appearance of the speech signal.

The basic idea of the invention is to integrate an echo canceller into a telephone exchange in such a way that converging of the echo canceller can be controlled by the call control of the telephone exchange by utilizing the internal call status data of the exchange. This makes it possible to start converging the echo canceller and to perform echo canceller convergence, for instance as soon as a subscriber outside the telephone exchange acting as the called subscriber answers (off-hook) and before the called subscriber manages to get the handset to his or her ear and starts talking, due to which the calling subscriber of the telephone exchange does not observe any echo, not even at the start of the call. Because the speech channel does not yet convey any speech signal, by means of which the echo canceller could be converged to the echo path, the echo canceller transmits a particular test signal, such as an impulse, to the echo path for this purpose.

The invention relates also to another method of converging an echo canceller at the start of a telephone call, which method is characterized in that the echo canceller integrated into a telephone exchange, transmits a test signal to the echo path in the direction of the calling subscriber between ringing tones at a moment controlled by a call control of the telephone exchange for converging the echo canceller by means of the test signal. In some cases, converging can also be performed by means of the very outgoing ringing tone.

Also this method is based on integrating the echo canceller into the telephone exchange in such a way that converging of the echo canceller can be controlled by the call control of the telephone exchange by utilizing the internal call status data of the exchange. This method aims to prevent an echo from occurring at the start of a telephone call also in a situation when a subscriber of the telephone exchange is the called subscriber and the intention is to avoid the test signal being heard disturbingly in the calling subscriber's ear. Then the test signal can be transmitted to the echo path in the direction of the calling subscriber at a moment controlled by the call control of the telephone exchange immediately after the ringing tones going to the calling subscriber, due to which the test signal will probably not be observed.

BRIEF DESCRIPTION OF THE DRAWING

The invention will be described in the following in greater detail by means of an embodiment with reference to the attached drawing, in which:

FIG. 1 shows a block diagram of an arrangement according to the invention, in which arrangement echo cancellers are integrated into a telephone exchange.

DETAILED DESCRIPTION OF PREFERRED EMBODIMENT OF THE INVENTION

The arrangement according to the invention can be applied in connection with any type of telephone exchange and adaptive echo canceller. FIG. 1 shows a telephone exchange comprising four near end lines A1 to A4, to which the subscribers of the telephone exchange are connected, and four far end lines, preferably 2,048 Mbit/s PCM lines according to the CCITT recommendation G.703, each line having 32 channels, 30 of which are telephone channels. Between the channels of the lines A1 to A4 and the channels of the lines B1 to B4, it is possible to switch transmission connections (calls) through a digital switching unit 1 in a manner known per se. The operation of the telephone exchange is controlled and monitored by a call control computer 2. The telephone exchange also includes devices and software for affecting the signalling to be used each time.

To each PCM line B1 to B4 of the for end is connected respective echo cancelling unit 4A to 4D, which carries out the echo cancellation of each PCM line channel separately, the channels being 31 in number in the exemplary case. Each echo cancelling unit 4A to 4D can thereby include a separate echo canceller for each channel. The operation of the echo cancellers 4A to 4D, especially switching on and off, is controlled by a computer 3 for the control of the echo cancellation via a common control channel 5 within the telephone exchange. The operation of the computer 3 is controlled by the call control computer via a control channel 6.

The control computer 3 thus acts as an interface between the call control 2 and the echo cancelling units 4A to 4D. The control computer 3 delivers the commands from the call control computer 2 to the echo cancelling units 4A to 4D in the corresponding control time slots of the timeshared control channel 5, the commands including e.g. commands for enabling or disabling the echo cancellation and the commands for starting converging. On the other hand, the call control computer 2 produces the commands for the control of the echo cancellers on the basis of a received echo cancellation signalling and on the basis of other call status information used by the call control, such as off-hook state (answering) of the called subscriber.

The purpose of the echo cancellers 4A to 4D is to eliminate the echo, originating from the near end and being caused by a speech signal originating from the far end, from reaching the far end. For this, the echo canceller creates a model of the echo path in the direction of the near end at the start of each call. The procedure of creating the model of the echo path is called converging.

In the following is explained how a converging of an echo canceller is started under control of the call control computer 2. It is assumed that a call is coming from outside the telephone exchange in one of the channels of the PCM lines B1 to B2 to a subscriber of the telephone exchange, which is connected to one of the channels of the PCM lines A1 to A4. In other words, the called subscriber is a subscriber of the telephone exchange and the calling subscriber a subscriber from outside the telephone exchange. The call control 2 of the telephone exchange handles the call in a normal manner and transmits a ringing signal, such as a ringing voltage, to the line of the called subscriber and a ringing tone (a ringback tone) to the direction of the calling subscriber. When the called subscriber answers the phone by picking up the handset off the hook or by activating the subscriber line in some other way, the call control 2 causes the echo canceller of respective telephone channel to start converging by an internal command of the telephone exchange over the control computer 3 and the control channel 5. Then the echo canceller transmits a particular test signal to the echo path in the direction of the calling subscriber. On the basis of this test signal the echo canceller is converged, i.e. it creates a model of the echo path on the basis of the transmitted test signal and the signal returned from the echo path. Due to this, the echo canceller is ready to cancel the echo immediately at the beginning of the speech so well that no echo is observed by the called subscriber.

Another case is assumed, in which a subscriber of the telephone exchange calls in one of the telephone channels of the lines A1 to A4 outside the telephone exchange in one of the telephone channels of the lines B1 to B4. The calling subscriber is then a subscriber of the telephone exchange and the called subscriber an external subscriber. Establishing the call in the telephone exchange proceeds again in a normal way. When another telephone exchange, to which the outside called subscriber is connected, starts transmitting a ringing tone back to the calling subscriber, the echo canceller connected to respective telephone channel transmits between the ringing tones a test signal to the echo path in the direction of the calling subscriber at a moment controlled by the call control and is adapted to the echo path by means of this test signal. Consequently, as soon as the called subscriber answers and speech begins, the echo canceller is ready to cancel the echo so well that no echo is observed by the called subscriber.

After the call, the call control 2 commands the echo canceller back to a normal state for a next call.

The drawing figure and the description relating to it are only intended to illustrate the present invention. As to the details, the method of the invention can vary within the scope of the following claims.

I claim:

1. A method for converging an adaptive echo canceller at the beginning of a telephone call between a calling subscriber and a called subscriber during which the called subscriber will transmit a speech signal to the calling subscriber, said method comprising:
   (a) establishing a transmission connection through a telephone exchange between a calling subscriber and a called subscriber over a telephone system which includes said telephone exchange, which telephone exchange has an adaptive echo canceller integrated thereinto;
   (b) at said telephone exchange detecting an off-hook state of the called subscriber, using a call control;
   (c) in response to said detecting of said off-hook state, outputting an internal command of said telephone interchange to said echo canceller from said call control, for initiating convergence of said echo canceller; and
   (d) in response to receipt by said echo canceller of said internal command, transmitting a test signal from said echo canceller along said transmission connection towards said calling subscriber, and using reception by said echo canceller of a return of said test signal along an echo path of said transmission connection to said echo canceller to converge said echo canceller before appearance of said speech signal on said transmission connection; and
   (e) utilizing said echo canceller, as thereby converged, to suppress echo in transmission of said speech signal on said transmission connection.

2. The method of claim 1, wherein:
said test signal is a pulse.

3. The method of claim 1, wherein:
said called subscriber is a subscriber of said telephone exchange and said calling subscriber is calling in from outside of said telephone exchange.

4. A method for converging an adaptive echo canceller at the beginning of a telephone call between a calling subscriber and a called subscriber during which the called subscriber will transmit a speech signal to the calling subscriber, said method comprising:
   (a) establishing a transmission connection through a telephone exchange between a calling subscriber and a called subscriber over a telephone system which includes said telephone exchange, which telephone exchange has an adaptive echo canceller integrated thereinto;
   (b) transmitting a series of ring-back tones along said transmission connection to said calling subscriber, indicating that an off-hook state does not yet exist in regard to said called subscriber;
   (c) at said telephone exchange using a call control to cause said echo canceller to transmit a test signal interspersed with said ring-back tones, towards the calling subscriber, for initiating convergence of said echo canceller;
   (d) using a return of said test signal along an echo path of said transmission connection to said echo canceller to converge said echo canceller before said called subscriber creates an off-hook state; and (e) utilizing said echo canceller, as thereby converged, to suppress echo in transmission of said speech signal on said transmission connection.

5. The method of claim 4, wherein:
said test signal is a pulse.

6. The method of claim 4, wherein:
said calling subscriber is a subscriber of said telephone exchange and said transmission connection connects said called subscriber to said telephone exchange via an intervening telephone exchange.

7. The method of claim 4, wherein:
said test signal is an outgoing ringing tone.

8. The method of claim 4, wherein:
said test signal is transmitted along said echo path towards said calling subscriber immediately after a ring-back tone, for reducing likelihood that the test signal will be observed by the calling subscriber.

* * * * *

UNITED STATES PATENT AND TRADEMARK OFFICE
CERTIFICATE OF CORRECTION

PATENT NO.   : 5,381,474

DATED        : January 10, 1995

INVENTOR(S)  : LÄHDEMÄKI et al.

It is certified that error appears in the above-identified patent and that said Letters Patent is hereby corrected as shown below:

On the title page:

add item [86], to include:
--PCT No.:  PCT/FI92/00289--;
--§ 371 Date:  June 23, 1993--;
--§ 102(e) Date:  June 23, 1993--; and add item [87], to include:
--PCT Pub. No.:  WO93/09611--;
--PCT Pub. Date:  May 13, 1993--.

Signed and Sealed this

Eighteenth Day of April, 1995

Attest:

BRUCE LEHMAN

*Commissioner of Patents and Trademarks*

*Attesting Officer*